Feb. 11, 1936.  E. B. GRUBER  2,030,511
MOTION TRANSMITTING MECHANISM
Filed Nov. 15, 1934
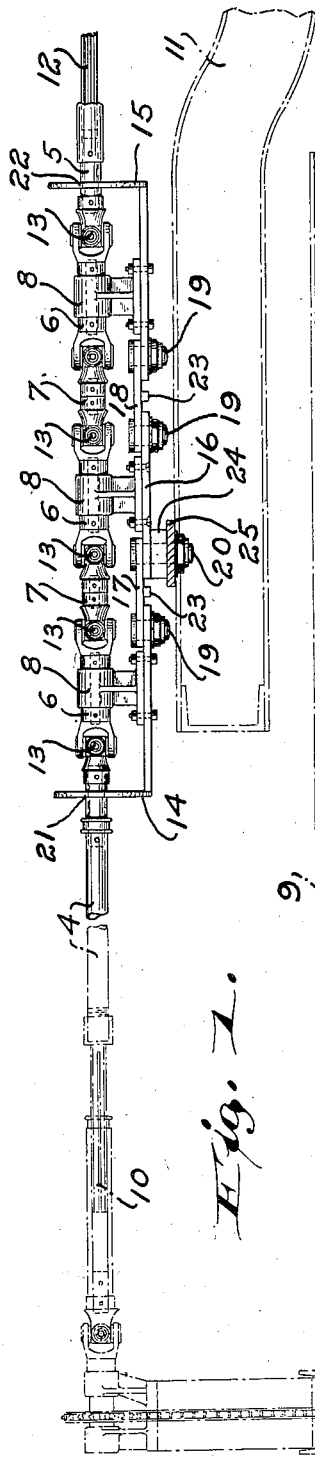
INVENTOR.
E. B. Gruber
BY
Morsell, Lieber & Morsell
ATTORNEY.

UNITED STATES PATENT OFFICE 2,030,511

MOTION-TRANSMITTING MECHANISM

Earl B. Gruber, Wauwatosa, Wis., assignor to The Heil Co., Milwaukee, Wis., a corporation of Wisconsin Application November 15, 1934, Serial No. 753,077

12 Claims. (Cl. 64—1)

The present invention relates in general to improvements in the art of transmitting rotary motion from a driver to a driven machine, and relates more specifically to improvements in the construction and operation of a flexible drive capable of transmitting rotary motion from one shaft to another disposed at variable angles with respect to each other.

Generally defined, an object of the invention is to provide improved rotary motion-transmitting mechanism which is simple in construction and efficient in operation.

It is common practice in the transportation of materials with the aid of trucks and trailers, to have each trailer provided with a hoist or other mechanism adapted to dump successive cargoes, while the hauling truck is provided with a source of power for actuating the dumping mechanism. The trailers are ordinarily detachably attachable to the truck through fifth-wheel mechanism which permits relative angular displacement of the truck and trailer through considerable angles, and a great deal of difficulty has heretofore been encountered in transmitting motion from the source of power on the truck to the driven mechanism on the trailer, especially if the trailer was disposed at an extreme angle out of alignment with the truck, when dumping of a cargo became desirable.

The present invention, therefore, contemplates provision of a compact, highly flexible drive especially adapted for the service above mentioned, which will permit efficient transmission of rotary motion from the source of power to the driven mechanism, throughout a wide range of relative angularity between the driving and driven shafts.

Another specific object of the invention is to provide an improved motion-transmitting mechanism comprising a series of universal joints, each of which is automatically subjected to only its proportionate degree of displacement as compared to the total angle through which driving is being effected.

A further specific object of the invention is the provision of an improved flexible drive which will eliminate twisting as in a rotating cable, but which possesses all of the advantages of a cable for transmitting rotary motion around a corner.

Still another specific object of the invention is to provide a multiple universal drive, wherein relatively standard universal joints may be utilized, and which may be manufactured and sold at moderate cost.

An additional specific object of the invention is to provide a motion-transmitting unit which may be furnished by the manufacturer in assembled condition, and which may be readily applied at the place of ultimate use.

Another specific object of the invention is to provide a flexible drive which may be swung through relatively great angles, but which will automatically assume straight-line position when the distorting force is released.

These and other objects and advantages will be apparent from the following detailed description.

A clear conception of several embodiments of the invention, and of the mode of constructing and of operating motion-transmitting mechanism built in accordance with the improvement, may be had by referring to the drawing accompanying and forming a part of this specification, in which like reference characters designate the same or similar parts in the several views.

Fig. 1 is a side elevation of one of the improved rotary motion-transmitting mechanisms, showing the same in straight-line position and associated with fragments of a truck and trailer, which are illustrated in dot-and-dash lines;

Fig. 2 is a top view of the mechanism of Fig. 1, showing the same swung into an extreme angular position with each section of the drive assuming its proportionate share of the total angle of displacement; and Fig. 3 is a top view of a modified type of the improved mechanism, showing the same in a position corresponding to that of Fig. 2, and also embodying means for automatically returning the drive to straight-line position upon release of the distorting force.

While the improvement has been illustrated and described herein as being specifically applied to a drive associated with a truck-trailer combination for a specific purpose, it is not intended to unnecessarily limit the scope by such disclosure.

Referring to the drawing, the improved rotary motion-transmitting mechanism shown in Figs. 1 and 2 comprises in general a driving shaft 4; a driven shaft 5; a series of end connected shaft sections 6, 7 interconnecting the shafts 4, 5; and relatively movable bearings 8 rotatably supporting the shaft sections 6. The driving shaft 4 may be rotated from any suitable source such as the propelling motor of a truck 9 and is provided with a telescopic detachable driving connection 10 of well-known construction. The driven shaft 5 is adapted to transmit rotary motion to any desired point of utilization such as a hoist carried by the trailer 11, and this shaft is also provided with a telescopic driving connection 12. The truck 9 and trailer 11 are relatively articulable about the king pin of a fifth-wheel mechanism, in a well-known manner, and this fifth-wheel mechanism is ordinarily interposed between the superimposed rear end of the truck 9 and front end of the trailer 11.

The ends of the shaft sections 6, 7 are connected to the adjacent ends of the shafts 4, 5 and of the successive sections 6, 7, by means of universal joints 13, each comprising a block having two sets of pivot pins disposed at right angles to each other and swingably engaging spaced projections of the respective shafts or shaft sections. These universal joints 13 are of relatively standard construction, and may assume a variety of forms, it being desirable, however, to utilize joints which afford positive drives and wherein twisting or relative angular displacement about the driving axis is eliminated.

The supporting bearings 8 for the alternate shaft sections 6 are mounted upon end brackets 14, 15 and an intermediate plate 16, the adjacent ends of which are interconnected by plates 17, 18 and pivot pins 19, 20. The end bracket 14 has a flange provided with a slot 21 through which the driving shaft 4 extends, and this slot 21 provides means for limiting the degree of swing of the shaft 4 relative to the first shaft section 6. The opposite end of the other bracket 15 has a flange likewise provided with a slot 22 through which the driven shaft 5 extends, and this slot 22 provides means for limiting the swing of the shaft 5 with respect to the last shaft section 6. Each of the plates 17, 18 has a depending transverse lug 23 disposed centrally thereof, and the lug 23 of the plate 17 is cooperable with the adjacent end of the bracket 14 and plate 16 to limit the relative angular displacement of these parts about the pivot pins 19, 20, while the lug 23 of the plate 18 is cooperable with the adjacent ends of the bracket 15 and plate 16 to similarly limit the relative angular displacement of these latter parts about the corresponding pivot pins 19. The plate 16 rests upon a spacing block 24 which, in turn, rests upon a cross-plate 25 carried by the trailer 11, and the pivot pin 20, which swingably connects the plate 16 with the supporting plate 25, may be disposed substantially in axial alinement with the king pin of the fifth-wheel mechanism, but not necessarily so.

From the foregoing description it will be apparent that the entire motion-transmitting assembly may be furnished as a unit which may be conveniently attached to or removed from the supporting plate 25 by means of a clamping nut or the like coacting with the main pivot pin 20. When the mechanism has been properly applied to a truck 9 and trailer 11, and the truck is alined with the trailed as shown in Fig. 1, all of the shafts 4, 5 and shaft sections 6, 7 are in axial alinement, so that rotary motion imparted to the driving shaft 4 will be transmitted to the driven shaft 5 in a straight line. If, however, the truck 9 and trailer 11 are angularly displaced about the fifth-wheel mechanism, as shown, for instance, in Fig. 2, the successive shafts 4, 5 and shaft sections 6, 7 will be relatively angularly displaced and the universal joints 13 will then compensate for the angular displacement. Because of the fact that most effective transmission of rotary motion through a universal joint of ordinary structure is possible only if the relative angularity of the driving and driven shafts is limited, it is desirable to limit the degree of angularity between the adjacent shaft sections of the drive, and when the shafts 4, 5 are shifted out of alinement, the slots 21, 22 and the lugs 23 automatically limit this angular displacement. If the relative angular displacement is great, the shafts 4, 5 engage the ends of their respective limit slots 21, 22, and the lugs 23 likewise engage the corners of the brackets 14, 15 and plate 16, thereby causing each universal joint to assume its proportionate share of the total angle of displacement, and insuring uniform transmission of the rotary motion. If the universal joints 13 are of like construction, these joints will likewise assume their proportionate degree of angular displacement for any lesser total displacement angle, during transmission of rotary motion from the shaft 4 to the shaft 5, or vice versa, thereby providing a highly effective drive under all conditions of operation.

While the drive of Figs. 1 and 2 will readily assume various angular positions during normal operation of the truck-trailer combination, it may be desirable in some cases to have the drive biased toward straight-line position. Such a drive is shown in Fig. 3, and the biasing mechanism consists of flat leaf springs 26 secured at their medial portions to the plate 16, and other leaf springs 27 attached to the brackets 14, 15. The ends of these leaf springs 26, 27 are cooperable with the opposite sides of the intervening plates 17. When the brackets 14, 15 and plates 16, 17 are relatively angularly displaced, the ends of the leaf springs 26, 27 are distorted, as disclosed in Fig. 3, and the springs are thus placed under tension. Upon release of the displacing force, the stressed leaf springs 26, 27 become effective to quickly and positively return the drive to straight-line position, and this return is effected regardless of whether the drive is displaced as shown, or in the opposite direction. In other respects the drive of Fig. 3 is the same as that of Figs. 1 and 2, and the leaf springs 26, 27 may be replaced by other types of biasing means.

From the foregoing description it will be apparent that the present invention provides improved rotary motion-transmitting mechanism which is simple and compact in construction, and which is, moreover, highly efficient in operation. The improved motion-transmitting assemblage may be furnished as a unit ready for installation and use for diverse purposes, and effective transmission of the rotary motion is assured by virtue of the fact that each of the universal joints is limited in its displacement to an efficient angle. The several successive universal joints will automatically assume their proportionate share of the total angularity involved in the displacement, and by providing means such as the leaf springs 26, 27, the drive will automatically assume straight-line position when released. The use of the positive drive universal joints eliminates twisting in the motion-transmitting member, and the improvement has proven highly successful in actual use. The drive can be manufactured and installed at moderate cost and requires no attention aside from occasional lubrication, after installation thereof.

It should be understood that it is not desired to limit the invention to the exact details of construction and to the precise mode of use herein shown and described, for various modifications within the scope of the claims may occur to persons skilled in the art.

It is claimed and desired to secure by Letters Patent:

1. A drive comprising, a series of rigid shaft sections disposed end to end, a universal joint connecting the adjoining ends of each set of adjacent sections of said series, bearings rotatably supporting some of said sections, pivotally interconnected plates supporting said bearings, means coacting with said plates for limiting the angular displacement afforded by each of said joints to a proportionate share of the total angular displacement of the drive when the latter is at the extreme limit of displacement, and resilient means for biasing said sections into axial alinement.

2. A drive comprising, a series of rigid shaft sections having universally connected adjacent ends, bearings rotatably supporting alternate sections of said series, pivotally interconnected supporting plates for said bearings, means cooperating with said plates, to limit the relative angular displacement thereof, and resilient means for biasing said sections into axial alinement.

3. A drive comprising, a driving shaft, a driven shaft, a series of universally interconnected rigid shaft sections universally connected at its ends to said driving and driven shafts, bearings for supporting some of said sections, swingably interconnected supports for said bearings, means coacting with each of said supports for limiting the angular displacement thereof relative to each other, and resilient means for biasing said sections into axial alinement.

4. A drive comprising, a telescopic driving shaft, a telescopic driven shaft, a series of universally interconnected rigid shaft sections universally connected to said shafts, bearings supporting some of said shaft sections, pivotally interconnected supports for said bearings means cooperating with said bearing supports for limiting the angular displacement of said shafts and shaft sections relative to each other, and resilient means for biasing said sections into axial alinement.

5. A drive comprising, a telescopic driving shaft, a telescopic driven shaft, a series of universally interconnected rigid shaft sections universally connected to said shafts, bearings supporting some of said shaft sections, means for limiting the angular displacement of said shafts and shaft sections relative to each other, and a common pivotal support for all of said bearings.

6. A drive comprising, a driving shaft, a driven shaft, a series of universally connected shaft sections connecting said shafts, bearings supporting some of said shaft sections, and a common pivotal support for all of said bearings.

7. A drive comprising, shafts having spaced ends, a series of universally connected rigid shaft sections connecting said shaft ends, bearings supporting alternate shaft sections of said series, pivotally interconnected supports for said bearings permitting articulation of one of said bearings relative to another, and a common pivotal support for all of said bearings.

8. A drive comprising, shafts having spaced ends, a series of universally connected rigid shaft sections connecting said shaft ends, bearings supporting alternate shaft sections of said series, pivotally interconnected supports for said bearings permitting articulation of one of said bearings relative to another, means for limiting the relative angular displacement of adjacent bearing supports, and a common pivotal support for all of said bearings.

9. A drive comprising, shafts having spaced ends, a series of universally connected rigid shaft sections connecting said shaft ends, bearings supporting alternate shaft sections of said series, pivotally interconnected supports for said bearings permitting articulation of one of said bearings relative to another, and springs coacting with said bearing supports for biasing said bearings into axial alinement with each other.

10. A drive comprising, a pair of spaced shafts, a series of universally connected rigid shaft sections flexibly connecting said shafts, bearings supporting alternate shaft sections of said series, pivotally interconnected supports for said bearings, springs coacting with said supports for urging said bearings into axially alined position, and means coacting with said supports for limiting the relative angular displacement thereof.

11. A drive comprising, a driving shaft, a driven shaft, a series of universally interconnected shaft sections connecting said shafts, bearings supporting some of said shaft sections, mean for biasing said shaft sections into axial alinement, and a common pivotal support for all of said bearings.

12. A drive comprising, shafts having spaced ends, a series of universally interconnected rigid shaft sections connecting said shaft ends, bearings supporting alternate shaft sections of said series, means for biasing said shaft sections into axial alinement, and a common pivotal mounting for all of said bearings.

EARL B. GRUBER.